United States Patent [19]

Purnell et al.

[11] Patent Number: 5,224,975
[45] Date of Patent: Jul. 6, 1993

[54] LITTER BOX DEODORIZER

[76] Inventors: Gabriel L. Purnell; Diana W. Purnell, both of 9619 Mary Rd., Berlin, Md. 21811

[21] Appl. No.: 539,821

[22] Filed: Jun. 19, 1990

[51] Int. Cl.$^5$ ............................................. B01D 39/00
[52] U.S. Cl. ......................................... 55/389; 55/515
[58] Field of Search ........................... 55/387, 389, 515

[56] References Cited

U.S. PATENT DOCUMENTS

| | | | |
|---|---|---|---|
| 1,737,532 | 11/1929 | Allen | 55/384 |
| 2,994,404 | 8/1961 | Schifferly | 55/DIG. 31 |
| 3,557,534 | 1/1971 | Kennedy | 55/389 |
| 3,719,033 | 3/1973 | Den Boer | 55/387 |
| 3,739,558 | 6/1973 | Hurson | 55/515 |
| 4,772,300 | 9/1988 | Cullen et al. | 55/389 |
| 4,793,837 | 12/1988 | Pontius | 55/389 |
| 4,858,561 | 8/1989 | Springer | 119/1 |
| 4,900,342 | 2/1990 | Spengler | 55/473 |
| 4,917,862 | 4/1990 | Kraw et al. | 55/387 |

FOREIGN PATENT DOCUMENTS 1596312  8/1981  United Kingdom ................. 55/387

OTHER PUBLICATIONS

*The Need For Air Cleaning*, Part I-Air Pollution, Rev. Aug. 1971, pp. 1-8.
*The Institute Report*, Clearing the air-of smoke, dust, other irritants, plus.
*How Deodooorizing Gives You The Sweet Smell of Profits*, Neil Brittman, Installation & Cleaning Specialists, pp. 42-44.
*NonScents News*, Mar. 1990, vol. III, No. 3; *NonScents News*, Dec. 1989; vol. II, No. 12; *NonScents News*, Nov. 1989, vol. II; *NonScents News*, Jan. 1990, vol. 1, No. 3; *NonScents News*, Apr. 1990, vol. III, No. 4.
*Nature's Odor Guard*, Zeolite Information Sheet, Environmental Care Center, Inc., Berlin, Md. 21811.
*What Stinks*, Non Odor Control System Scents, Gabriel Purnell, Environmental Care Center, Berlin, Md 21811.
*Nonscents Laboratory Product Use Application Guide*, pp. 1-3.
*Clean Air System Scents*, Smoke-Bacterial Odor Adsorbent, NonScents, Inc., Houston, Tex.
*Indoor Air Pollution Consumer Reports*, Oct. 1985, p. 603.
*Clean Air To Live In*, David Quentzel, Good Housekeeping, Aug. 1965, p. 2465.
*Odor Control*, Herb Harpham, Building Services Contractor, Feb. 1986, pp. 36, 38.
*Zeolites, Catalyze Ptaent Dispute*, Jan 4, 1985.
*Molecular Sieve*, p. 618.
*Evaluation of Clinoptilolite Zeolite for Removal of Lead From Domestic Drinking Water*, Dave Leppert, Ken-Dunder, EPA Region 10, Teague Mineral Products and Hydrokinetic Systems, Inc., Salem, OR 97302.
*East West Minerals*, Technical Data Sheet No. 101, East West Minerals Inc., Mill Valley, Calif. 94941.
*General Information on Natural Zeolites*, No. 565, East West Minerals, Inc., Mill Valley, Calif. 94941.
*Boodabox* ®, Booda Products Inc., Gardena, Calif. 90248.
*Booda Loo* ®, Booda Products Inc., Gardena, Calif. 90248.

*Primary Examiner*—Bernard Nozick
*Attorney, Agent, or Firm*—Banner, Birch, McKie & Beckett

[57] ABSTRACT

A deodorizing device for use in a pet's litter box, for example. The deodorizing device has a container body having an open end, a closed end and a cylindrical side wall defining a cavity therein. Chunks of zeolite are disposed within the cavity and retained within the container body by a sealing mechanism. The cylindrical side wall of the container body has a plurality of substantially uniform-sized apertures disposed thereon to permit exposure of the retained zeolite to the odors. A sealing mechanism may be permanently or releasably attached to the container body. A securing mechanism secures the deodorizing device to a structure within the malodorous environment. The zeolite after use can be recharged by exposing to fresh air, sunlight and heat and then reused. In addition to being used in a pet's litter box, the device can be used in many environments, including animal containment areas, living areas, production areas, food storage areas, work areas and automobiles.

3 Claims, 3 Drawing Sheets

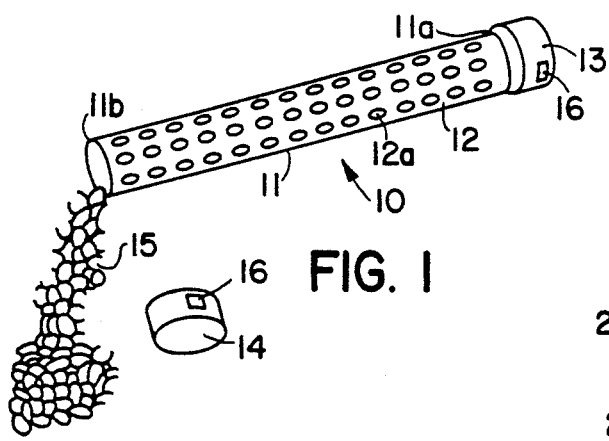
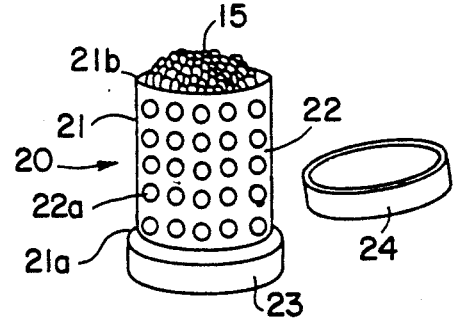
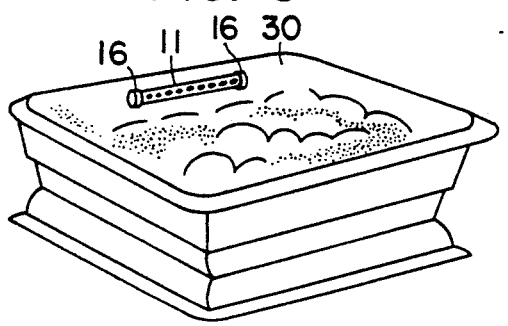
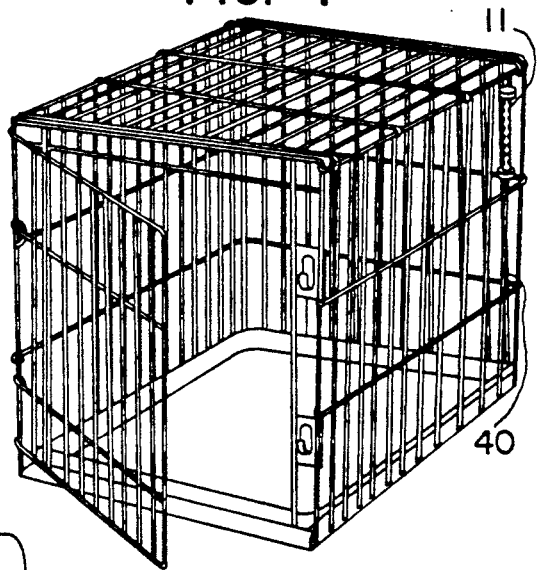
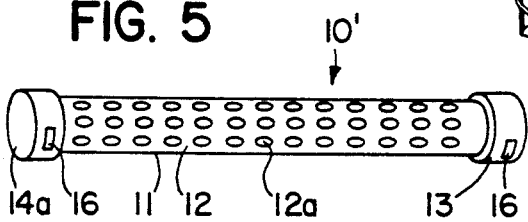
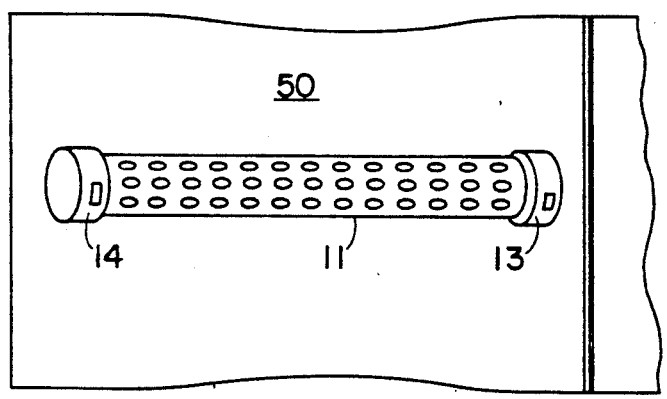

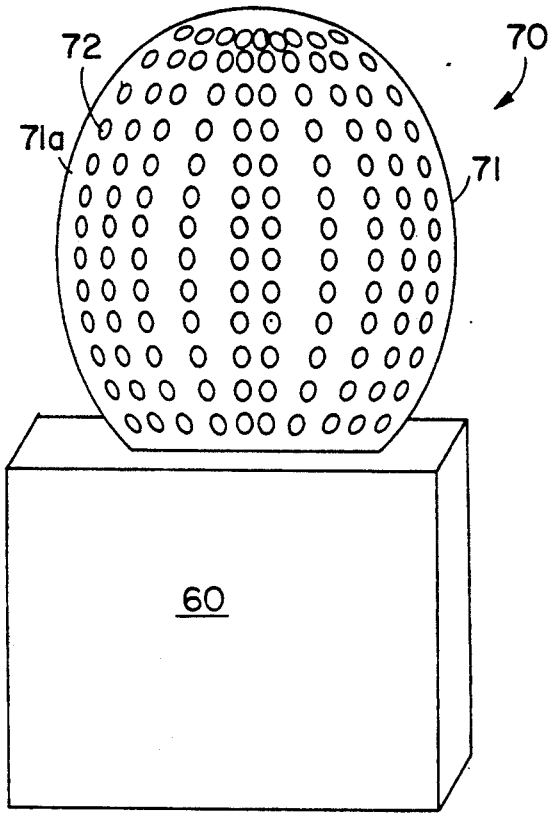
FIG. 7
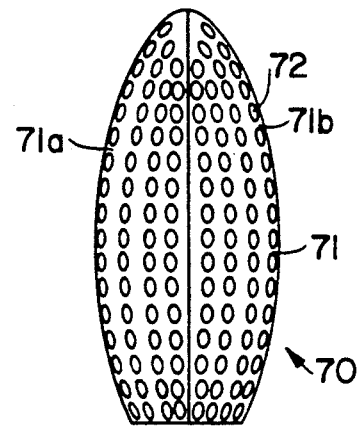
FIG. 8
FIG. 9
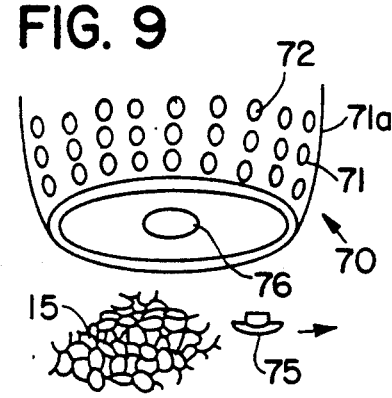

LITTER BOX DEODORIZER

BACKGROUND OF THE INVENTION

The invention relates to deodorizing devices and methods of making and using the same, and more particularly, to deodorizing devices for deodorizing pet litter boxes.

In today's environment, concerns about air pollution have become increasingly significant. In recent years, indoor air pollution has become more of a problem, and it has brought about the development of numerous air cleaning devices, materials, products and methods. The rapidly growing problem of air pollution has thus made it important to develop new devices and methods for obtaining cleaner air and a better environment.

Particles, odors, bacteria, microorganisms and other contaminants are frequently unpleasant and sometimes unhealthy to breathe. Particle contaminants are about 13% of the total contaminants found in the air of homes, offices, kennels and other enclosed areas. A particle is defined as an object having definite physical boundaries in all directions, limited in size to objects having diameters ranging from 0.001 microns to 100 microns including liquid and solid suspensions in the air. Public data on domestic sources of pollution report that solids and other pollutants are a part of everyday living in the home, especially homes with cats, dogs, birds, ferrets or other pets. Particulate pollution is a major concern because particles function as major "carriers" of other sources of air pollution. It is estimated that the average man inhales 40,000-70,000 dust particles with every breath amounting to 22,000 times a day. This can be very costly physically, economically and environmentally.

In addition to particles, there are many other sources of air pollution. Vapors and gases, for example, may make breathing difficult. Vapors are formed from liquids or solids, and gasoline, mercury and camphor are examples of substances that are easily vaporized. Airborne living organisms, such as viruses, pollen grains and bacteria, are also contaminants. Most pet odors are produced from waste and body fluid, which are of nitrogen and sulfur origin. When accompanied by bacterial action these wastes make putrefaction and decay a continual odor source and nuisance in the indoor environment.

To clean air effectively in large areas mechanical filters and electronic air cleaners are often used. These devices include air exchange filtration systems, or electronically charged fields and plates to collect and remove particle matter. Even though they are air cleaners, the devices in some cases produce ozone, which is an air pollutant. Mechanical, filtered and electrical devices can be expensive, require costly maintenance and in some areas are restricted in their use. Electronic air cleaners in some instances also stir up the dust particles which are too small to be filtered out.

Household odors such as burning tobacco, cooking foods, pets, mildew, refrigerator odors, carpet odors, bathrooms, chemicals, garbage containers, closets and basements are difficult to control because they are many and different in source. Aquariums, pet litter boxes, bird cages, kennels, smoking rooms, kitchens and other indoor areas typically have significant odor problems. There are many different products on the market for deodorizing and freshening the air. Such products are produced in many forms including mists, blocks, liquids, powders, granules and gases. Various methods are employed when using these products to control malodors.

Odor masking superimposes one malodor on another stronger odor, thereby creating a new and often unpleasant odor. The method is typically used in toilet areas, and often the problem is many people do not like the odors produced from the materials which are usually chemically derived. Odor cancellation is achieved when certain odor pairs are combined such as lemon and fish. The impulses sent to the brain conceal each smell, and the brain thereby perceives little or no odor. This method by placing chemicals, fogs, mists or sprays into the air is undesirable. Oxidation is another means of odor control, but it is complex because ozone is involved. Oxidation can be dangerous to humans depending on the amounts and levels of the substances used. Chemical reactions require deodorizers that provide a lasting effect, and they are usually chemical concentrates in liquid, block and granular forms. This method is used mostly because they are low in cost, but usually are pollutants themselves because of the chemical fumes and gases that are released. Biological methods of combatting odor include using enzymes and bacteria to break down odor causing matter. Urine and waste odors are broken down slowly, and these methods are not always 100% effective. Enzymes are typically safe, cost effective and easy to use, so their use is becoming more common. However, they are limited in their use and versatility.

Many solutions have been proposed to purify and freshen the air. Allen in U.S. Pat. No. 1,737,532 discloses an air purifying and deodorizing device for use in refrigerators, toilets and sick rooms. A metallic container having a perforated surface and an absorbent deodorizing material disposed therein is placed within the refrigerator. Preferably the deodorizing material contains charcoal combined with other ingredients having germicidal qualities. Sealing members are provided to facilitate storing the device over considerable periods of time. This design is disadvantageous because charcoal as well as activated carbons have amorphous structures with widely diverging pore sizes.

Ensar Corporation of Wheeling, Ill. markets the ODOR FREE device for pet litter boxes. The device is L-shaped and has a pair of projections that allow the device to be slipped onto the side of the litter box to absorb odors therefrom.

Nature's ODOR GUARD is commercially marketed from Boise, Id. and uses SC Zeolite, whose chemical name is clinoptilolite, in powder or granular form. The powder is sprinkled on the odor source. The granular form, which is contained in bags, is placed on or near the odor source.

The NONSCENTS odor control system is commercially available in bagged powder and bagged granular cap form. The NONSCENTS product uses a natural zeolite to control odors. The NONSCENTS "Product Use Guidelines" recommend applying two to four tablespoons of NONSCENTS powder per pet litter box. It is also known to sprinkle the powdered NONSCENTS zeolite on carpets to deodorize them.

The BOODABOX and BOODA LOO odor-free litter boxes are commercially marketed by Booda Products Inc. of Gardena, Calif. Both litter boxes use charcoal air filters and/or pan liners to eliminate odors therein.

Prior art uses of zeolite include sprinkling zeolite powder in pet litter boxes and carpets. It is also known to place bags containing zeolite in ventilation ducts to deodorize the home. Bags of zeolite have been placed in the past in aquariums to deodorize and remove ammonia from the water. Zeolite has also been used adjacent to waste water lagoons. Other deodorizing materials which have been used to deodorize pet litter enclosures include pine, fir and other scented woods in saw dust form.

SUMMARY OF THE INVENTION

Accordingly, a primary object of the present invention is to provide an improved device for eliminating odors.

Another object of the invention is to provide a device that can be detachably attached to a surface in a malodorous environment.

A further object of the invention is to provide a device that includes a reusable deodorizing material.

A still further object of the invention is to provide methods of making and using improved deodorizing devices.

Directed to achieving these objects, the present invention provides a deodorizing device including a container body in the form of a hollow cylinder having a closed end, an open end and a side wall disposed therebetween. The side wall, which can be but preferably is not transparent, has a plurality of uniformly sized apertures disposed along its circumference to permit air circulation therethrough. Chunks of zeolite are placed within the hollow cylinder. The chunks are retained within the container body because they are larger than the apertures in the side wall. A detachable end cap is frictionally engaged about the open end of the container body. A securing mechanism may be included to releasably secure the deodorizing device to a surface in a malodorous environment. The chunks of zeolite are periodically removed from the deodorizing device and placed in sunlight and heat for a period of time sufficient to drive off the captured odors. The recharged or reinvigorated chunks of deodorizing material are then reinserted in the deodorizing device for further use. After a period of use, recharging and reuse, the chunks of zeolite are replaced with fresh ones. For smaller uses such as around household litter boxes, the end cap is affixed to the container body after being filled with between 0.25 and 0.75 ounce of zeolite. To recharge the zeolite, the entire device is placed outdoors and the apertures provide sufficient ventilation and exposure of the contained zeolite to heat and sunlight to recharge the zeolite. The device is then returned to the litter box environment and reused. As an example, the device should be recharged for a day every month. Once a year, the zeolite granules or the entire device are replaced.

Other objects and advantages of the present invention will become apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of a first deodorizing device of the present invention illustrated in an open position.

FIG. 2 is a perspective view of a second deodorizing device of this invention.

FIG. 3 is a perspective view of the deodorizing device of FIG. 1 illustrated in use in a pet's litter box.

FIG. 4 is a perspective view of the deodorizing device of FIG. 1 illustrated in use in a bird cage.

FIG. 5 is a side elevational view of the deodorizing device of FIG. 1.

FIG. 6 is a side elevational view of the deodorizing device of FIG. 1 illustrated stored in an enveloping mechanism.

FIG. 7 is a perspective view of a third embodiment of the deodorizing device embodying the present invention.

FIG. 8 is a partial side elevational view of the deodorizing device of FIG. 7 with the plug illustrated in an open position.

FIG. 9 is an edge view of the deodorizing device of FIG. 7.

DETAILED DESCRIPTION OF PREFERRED EMBODIMENTS OF THE INVENTION

Figure 10:
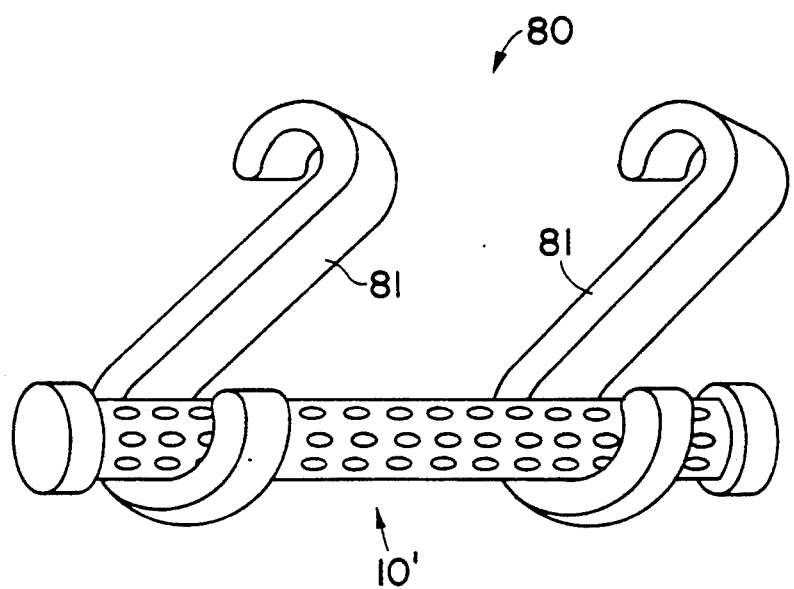
FIG. 10 is a perspective view of the deodorizing device of FIG. 5 secured by a cradle or hooks.

In the figures wherein like reference numerals designate like parts, a deodorizing device for use in a malodorous environment in accordance with the present invention is designated generally as 10. FIG. 1 illustrates device 10 in an open position. The deodorizing device 10 includes a container body 11, preferably in the form of a hollow cylinder, having a closed end 11a, and open end 11b and a side wall 12 disposed therebetween. Although the side wall is preferably cylindrical, generally any shape may be used. Side wall 12 has a plurality of uniformly sized apertures 12a disposed along its circumference to permit air circulation therein. Deodorizing material 15 is placed within container body 11 through opening 11b, substantially filling the hollow interior of container body 11. A detachable end cap or sealing mechanism 14 is then secured about the open end 11b of the container body. Although detachable end cap 14 is preferably frictionally engaged on the container body, any conventional sealing mechanism may be used. It is preferred to use an opaque material, but transparent materials are also contemplated for use in constructing the deodorizing device. The deodorizing device is preferably made of PVC and has a size ranging from about one-half inch to about two inches in diameter, about two inches to about six feet in length, and has apertures 12a of about one-sixteenth of an inch to about one inch in diameter (if circular in shape) and having about four to about twenty holes per square inch.

A securing mechanism 16 can be used to secure the deodorizing device to a structure within the malodorous environment. Although any conventional securing mechanism could be used, preferably hook and loop fasteners sold under the trademark VELCRO are used. Alternatively, a cradle 80 (see FIG. 10) made of metal or plastic hooks 81 may be used as a securing mechanism.

As best seen in FIG. 3, the deodorizing device may be detachably secured to a pet litter box 30 to deodorize it and its environment. The present invention is also suitable for closed or substantially sealed litter enclosures. Springer in U.S. Pat. No. 4,858,561 discloses a substantially sealed enclosure that prevents scattering of the litter and the emission of odors, which would benefit from the use of the present invention in the enclosure. The present invention has been used in the BOODA- BOX litter box to effectively remove odors. It is contemplated to provide a filter made of zeolite in place of the charcoal filters supplied in the BOODABOX litter box. This zeolite filter or deodorizer can also be used in other similar systems or cat litter boxes. It is further contemplated to utilize the present invention's use of zeolite in lieu of the pan liners.

As seen in FIG. 4, deodorizing device 10 may be detachably secured to an animal cage 40 to deodorize it. It similarly can be used in aquariums, actually within the water, or in larger versions near waste water lagoons.

The deodorizing material is preferably a zeolite. Zeolites are naturally occurring minerals having substantially uniform pore sizes. Therefore, zeolites are preferred over activated carbons which have amorphous structures with widely diverging pore sizes. Clinoptilolite is a natural, inorganic zeolite used as a selective ion-exchange medium for removal of ammonia from plant waste water. There are approximately thirty-four species of zeolite minerals and approximately one-hundred types of synthetic zeolites. The term zeolite is used broadly herein to encompass natural and synthetic substances as well as hydrated aluminosilicates and other chemically based substances.

Some zeolites have been called molecular sieves because of their microporous crystalline structures which undergo dehydration with little or no change in crystalline structure. The empty cavities in activated molecular sieve crystals have a strong tendency to recapture water molecules that have been driven off. This tendency is so strong that if no water is present, they will accept any material that can enter the cavities. However, only molecules that are small enough to pass through the pores of the crystals can enter the cavities and be adsorbed on the interior surface. This sieving or screening action makes it possible to separate smaller molecules from larger ones, hence the name molecular sieve.

FIG. 2 illustrates a second embodiment 20 of a deodorizing device of the present invention including a container body 21 having a closed end 21a, an open end 21b, and a side wall 22 disposed therebetween. Side wall 22 similarly includes a plurality of apertures 22a disposed therealong. Secured at closed end 21a is a fixed end cap 23. Disposed along open end 21b is a detachable end cap 24. Deodorizing device 20 is adapted for use as a free standing unit within a refrigerator, for example. Chunks 15 of zeolite are larger than the apertures 22a in the container body 21 but small enough to pass through the open end 21b of the container body. Appropriately sized chunks of zeolite having a maximum dimension between about one-eighth of an inch (or one third of an inch) and about one inch are thereby retained within the container body since they cannot pass through the apertures. Depending on factors including the amount and intensity of odor causing matter, the size of the area to be deodorized, the size of the deodorizing device used and the amount of zeolite used, the zeolite having captured malodors may be removed monthly and placed in sunlight and heat for about one to four days, preferably one day, to drive off the captured odors. The recharged zeolite may then be reinserted into the deodorizing device and reused to capture malodors. After twelve months of use and reuse, the zeolite is disposed of and a fresh batch of zeolite inserted.

FIGS. 5 and 6 illustrate a third embodiment 10' of the deodorizing device. This embodiment has a closed configuration with both end caps permanently secured to the container body. FIG. 6 illustrates a storage mode in which the deodorizing device is enclosed within an enveloping mechanism or zippered pouch 50. The third embodiment is the preferred embodiment of the invention and differs from the first embodiment only in the respect that it is preferable to have both end caps fixedly secured to the container body whereas the first embodiment has a detachable end cap. In FIG. 1, end cap 14 is detachable. In FIG. 5, end cap 14a is permanently secured to the container body after the zeolite is inserted therein.

Preferably clinoptilolite is used as the deodorizing mechanism, and about 0.25 to about 0.75 ounce of clinoptilolite is inserted into and substantially fills the container body, which can be but preferably is not transparent.

Preferably the zeolite is placed in the container body and both end caps are fixedly secured thereto. The entire deodorizing device is placed into the malodorous environment to capture malodors. Preferably the deodorizing device is removed monthly and placed in sunlight and heat for one day to drive off the captured odors. The recharged deodorizing device is then reinserted in the malodorous environment. Preferably after twelve months of use and reuse, the deodorizing device is disposed of and a new deodorizing device is used.

FIGS. 7-9 illustrate a fourth embodiment 70 of the deodorizing device. A decorative sculpture having a container body 71 can be disposed on a table or stand 60. Container body 71 includes a left shell 71a and a right shell 71b. Both shells 71a, 71b include a plurality of apertures 72. As best shown in FIG. 9, the bottom of container body 71 includes a plug 75 which is releasably secured within opening 76 to retain the deodorizing material 15 within the container body and through which the zeolite material can pass.

As will be appreciated by those skilled in the art, the present invention can be used in many different areas and environments and can be modified as needed for those areas and environments. For example it can be used in floor drains to capture escaping gases or in refrigerators, freezers or trailers for transporting meat products. The present device also apparently removes bacteria from its environment and thereby reduces the likelihood that nearby perishable foods will spoil.

Numerous characteristics, advantages and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

What is claimed is:

1. A deodorizing device for deodorizing a malodorous environment comprising:
   a container formed by an elongated hollow body having a generally cylindrical exterior wall terminating in open ends;
   a plurality of through-openings penetrating said cylindrical wall and being spacedly disposed about the full circumference thereof to establish communication between the interior of said container and the environment exteriorly thereof;
   said container interior containing an amount of particulate zeolite, the particle sizes of which are greater than the size of said through-openings to permit retention of said zeolite within said container;

end caps closing the respective ends of said container, at least one of said end caps being defined by a body having a generally cylindrical external surface and a concentric recess extending into said body from one end thereof, said recess being formed of a diameter to tightly engage the exterior wall of said container for closing at least one said end thereof;

said external surface of said end caps being concentrically spaced from said exterior wall of said container by an amount sufficient to permit exposure of said container exterior wall about its entire circumference to said environment; and means on at least one of said end caps for mounting and supporting said deodorizing device in its operative position.

2. A deodorizing device according to claim 1 in which said mounting means comprises means on said external surface of said end caps for joinder to an adjacent surface.

3. A deodorizing device according to claim 1 in which said at least one of said end caps is formed of a body whose diameter is sufficiently large with regard to the length of said container body as to support said device in a free standing disposition.

* * * * *